Figure 1:
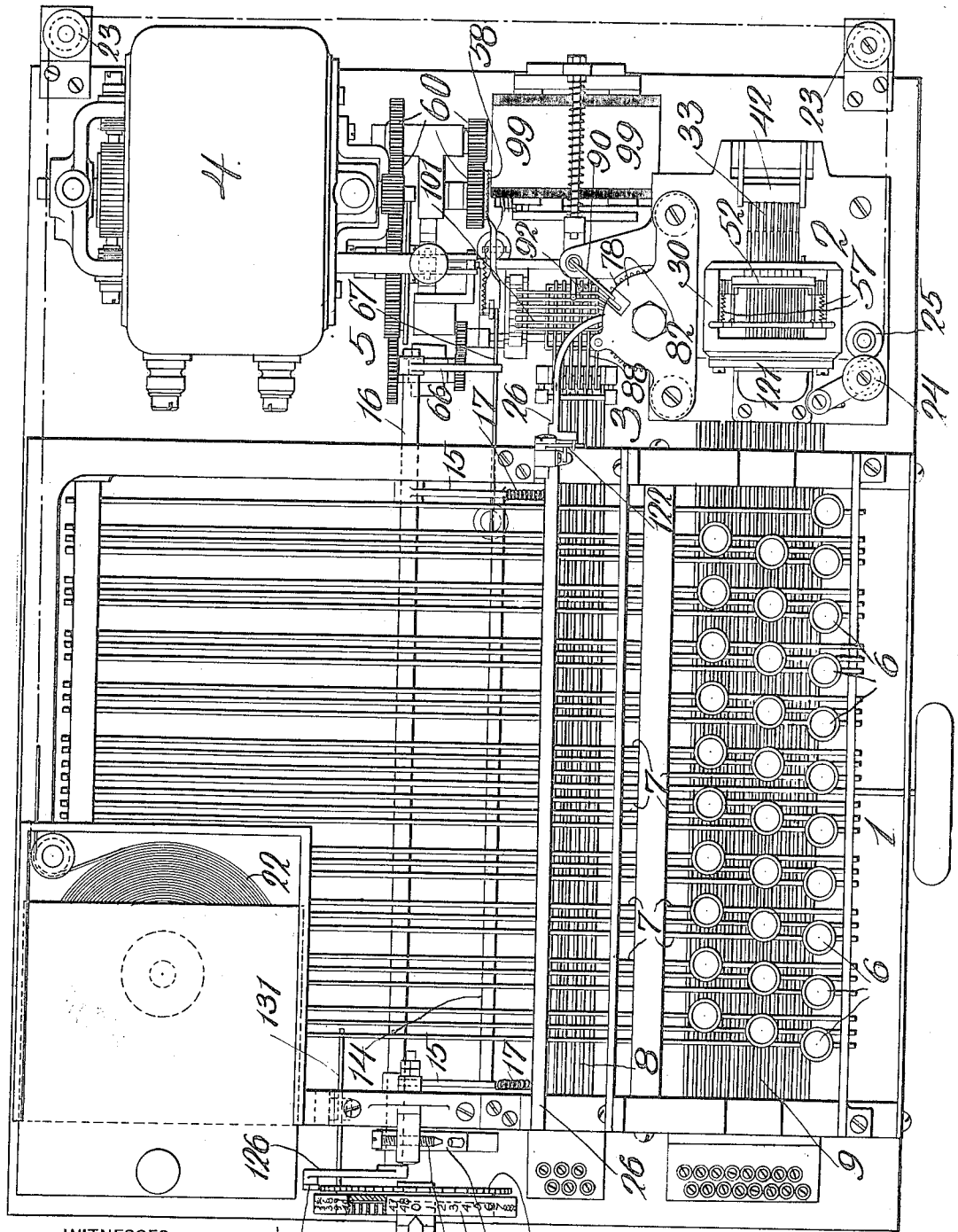

No. 893,420. PATENTED JULY 14, 1908.
J. C. BARCLAY.
PERFORATING MACHINE.
APPLICATION FILED DEC. 29, 1906.

10 SHEETS—SHEET 1.

WITNESSES:

INVENTOR
John C Barclay
BY
H. M. Marble
ATTORNEY

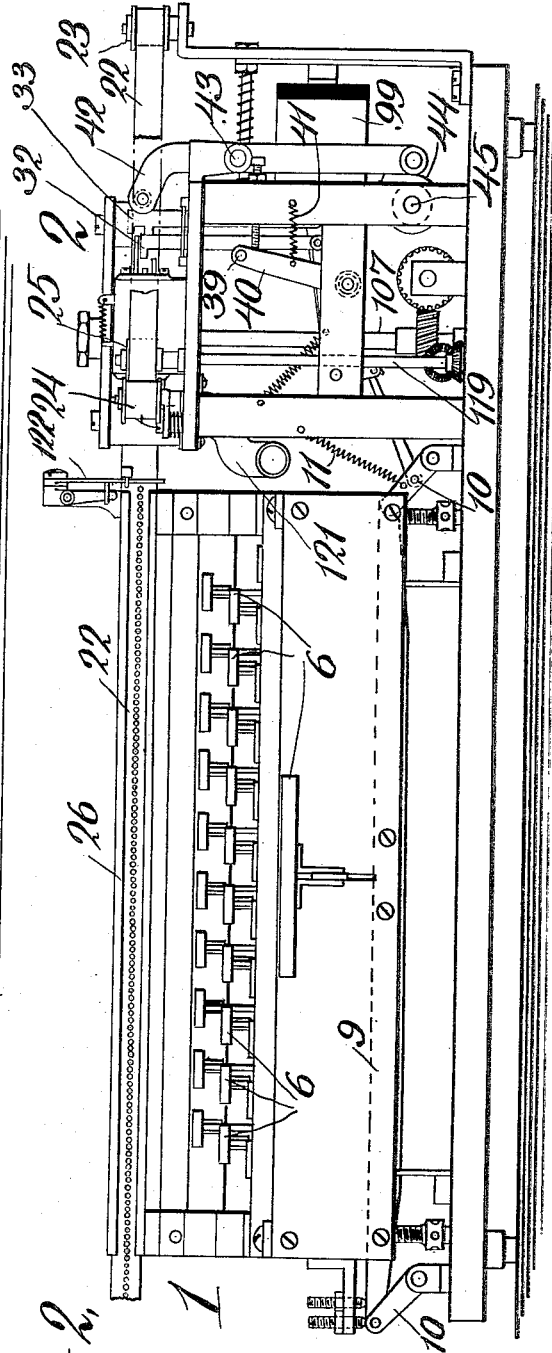

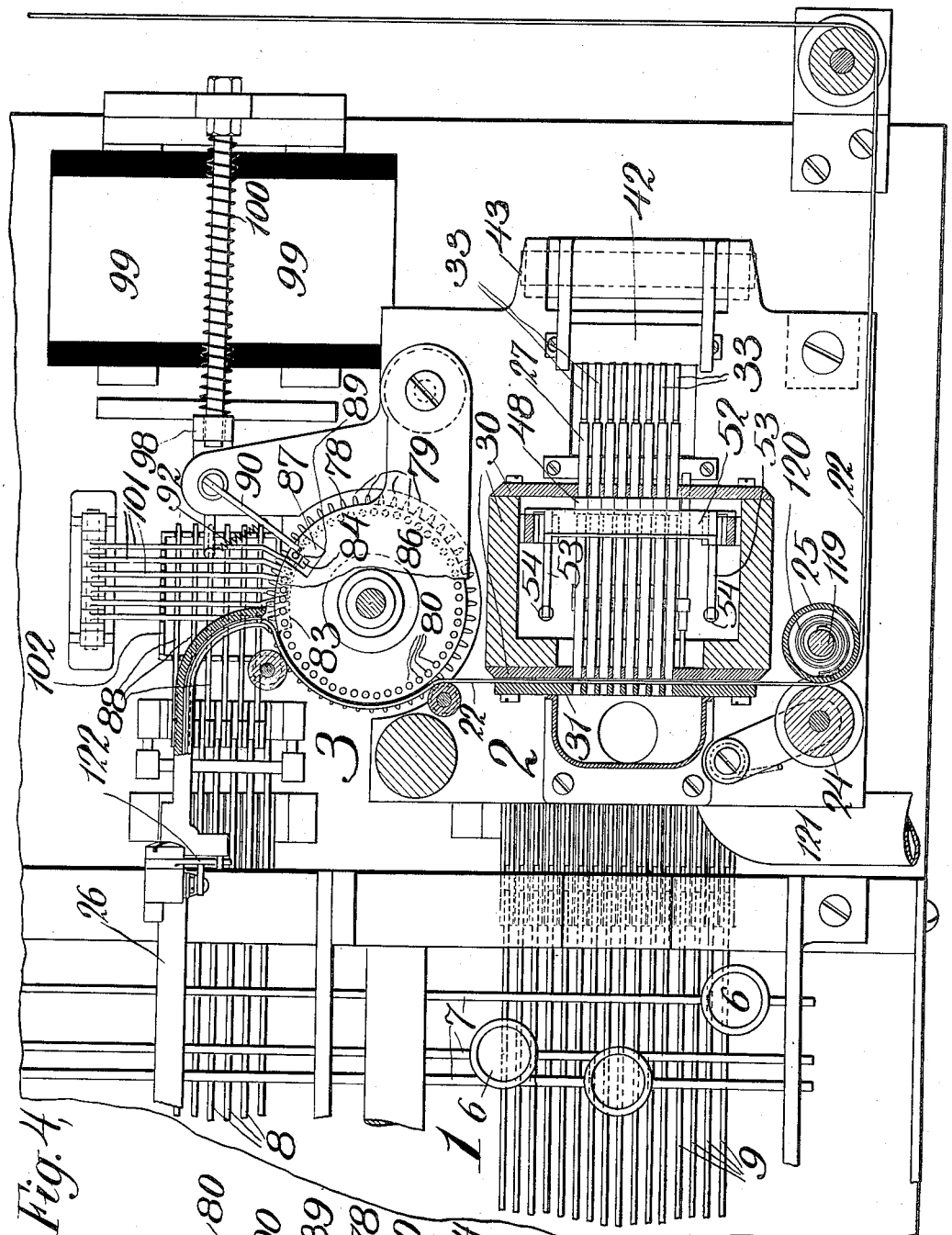

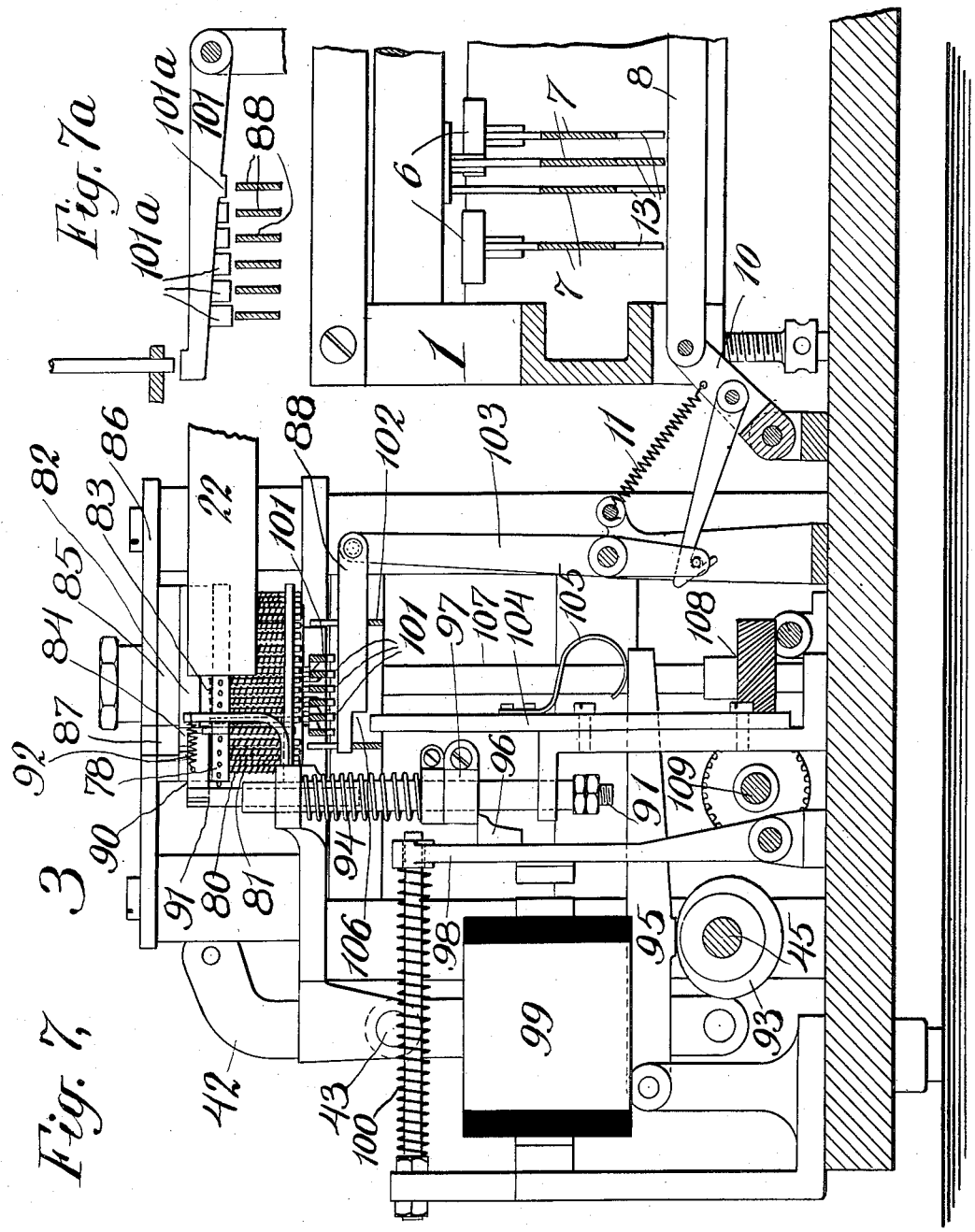

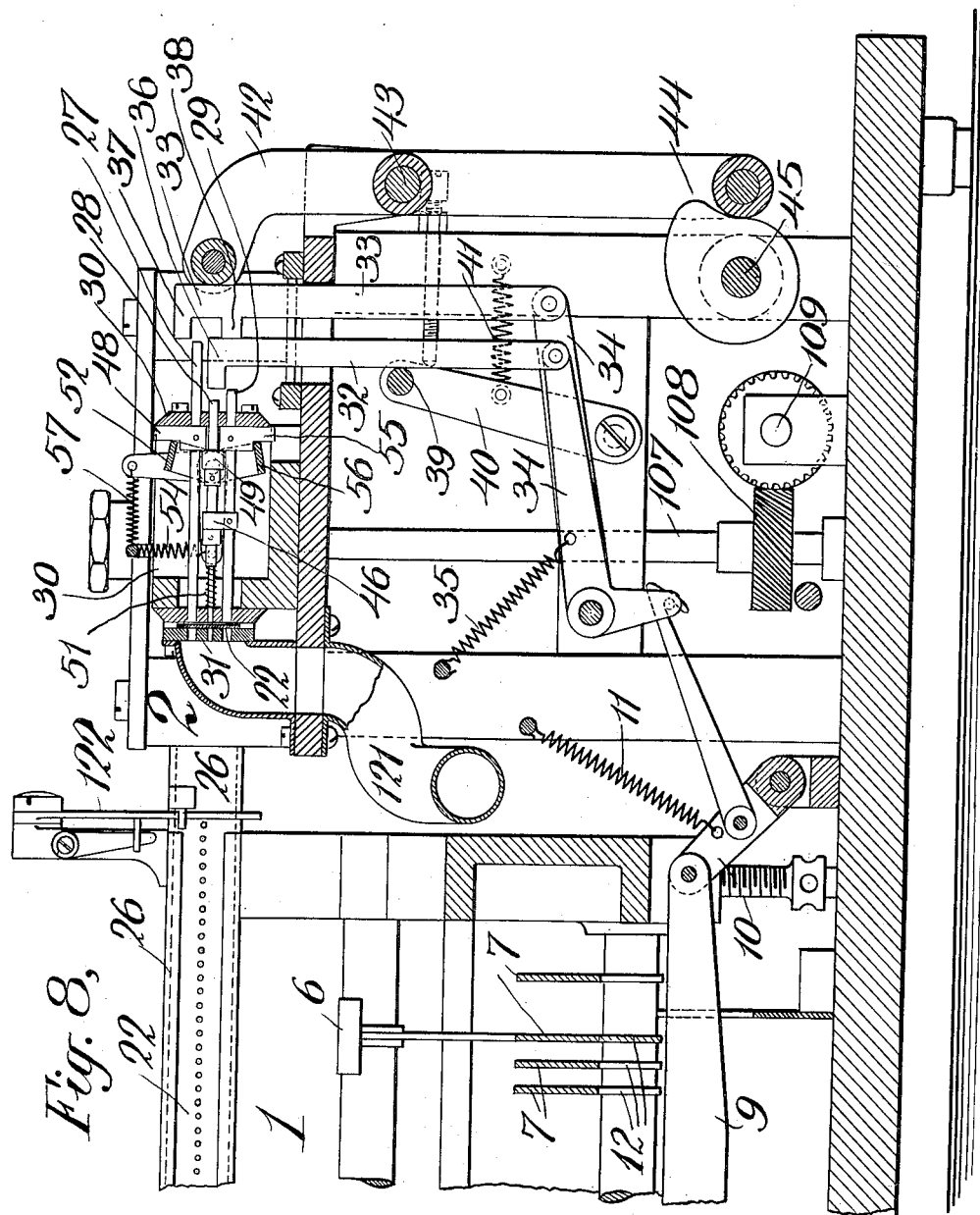

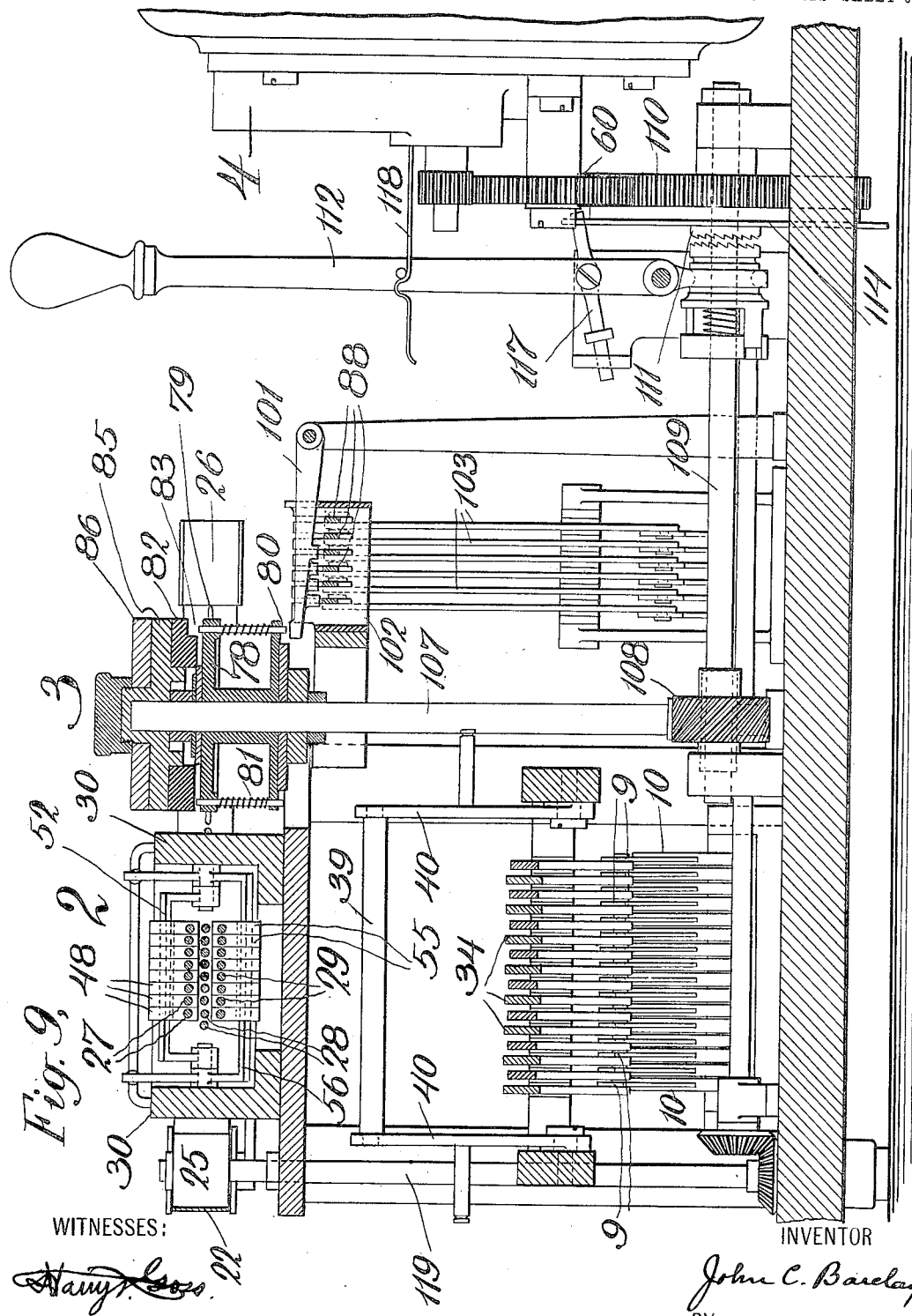

No. 893,420.
PATENTED JULY 14, 1908.
J. C. BARCLAY.
PERFORATING MACHINE.
APPLICATION FILED DEC. 29, 1906.
10 SHEETS—SHEET 7.
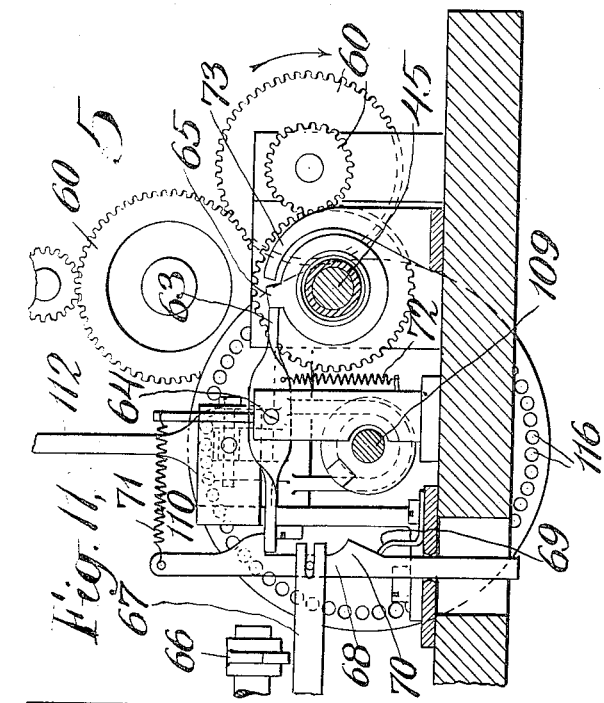
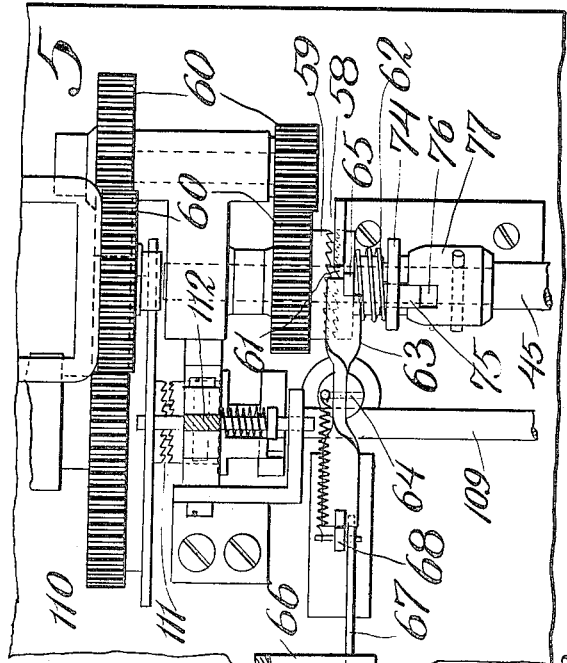
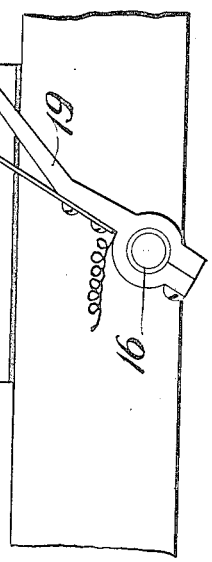
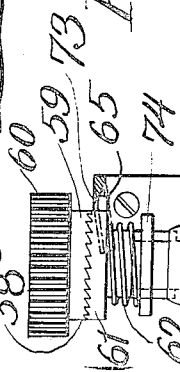
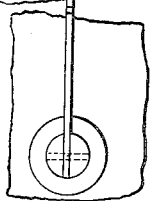
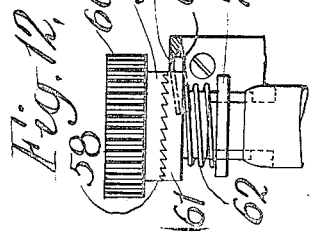
WITNESSES:
INVENTOR
John C. Barclay
BY
H. M. Marble
ATTORNEY No. 893,420. PATENTED JULY 14, 1908.
J. C. BARCLAY.
PERFORATING MACHINE.
APPLICATION FILED DEC. 29, 1906.
10 SHEETS—SHEET 8.
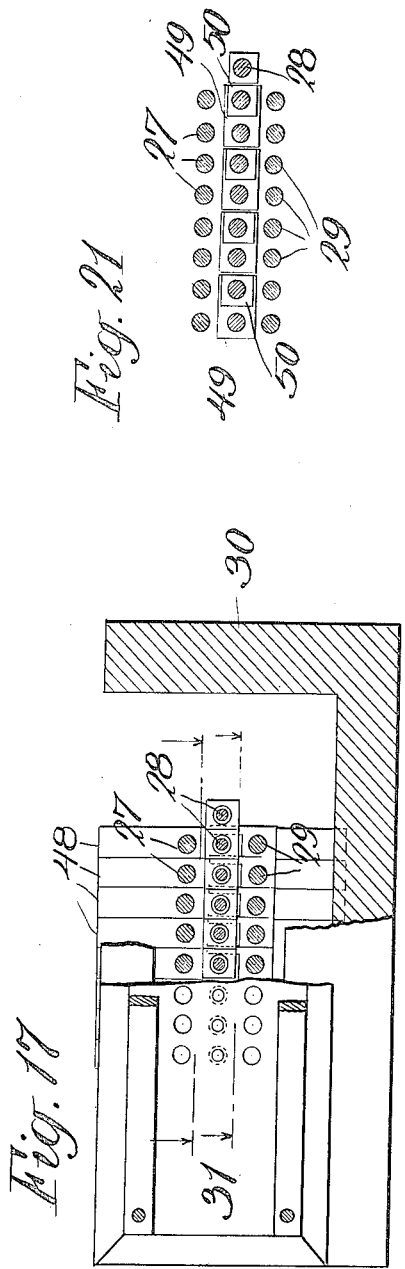
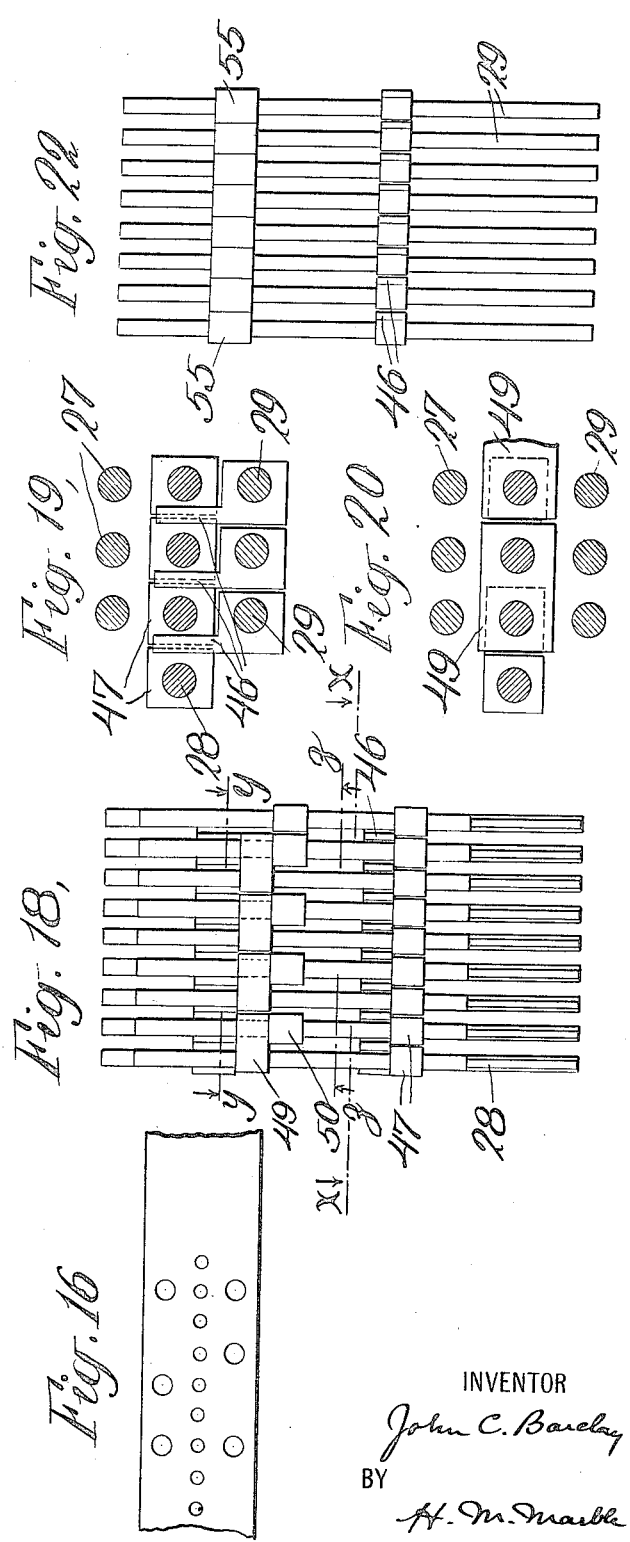
WITNESSES:
INVENTOR
John C. Barclay
BY
H. M. Marble
ATTORNEY

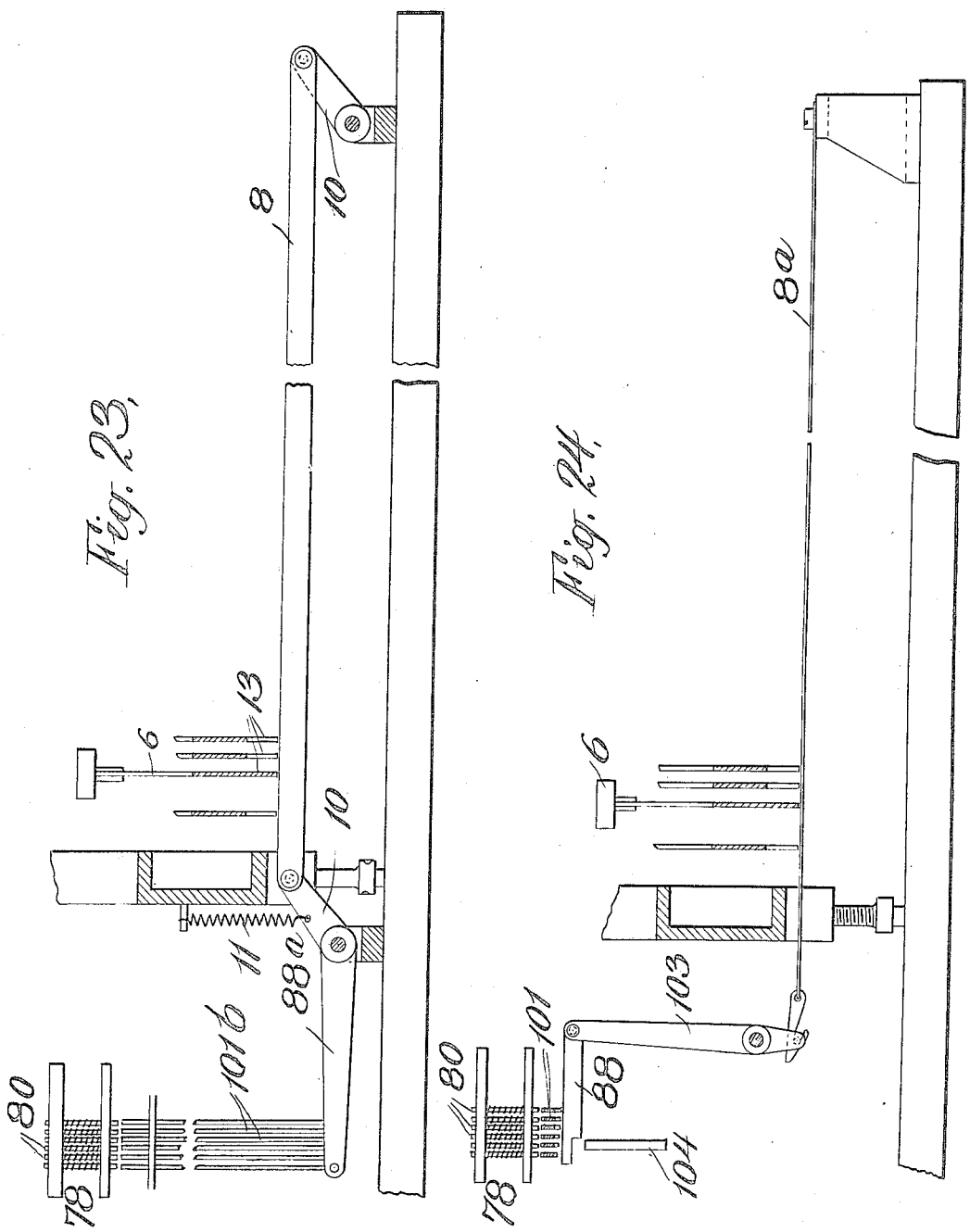

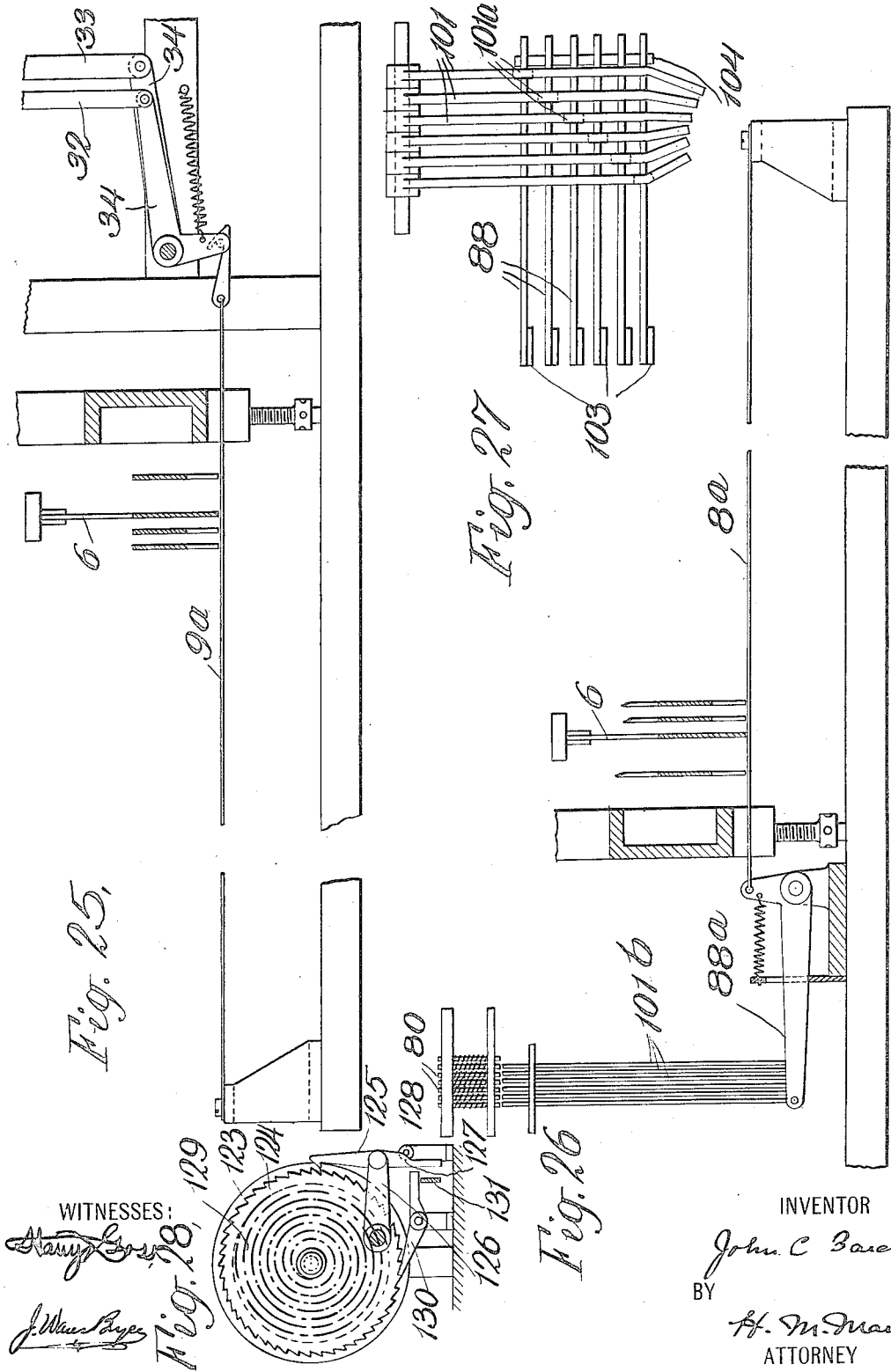

UNITED STATES PATENT OFFICE.

JOHN C. BARCLAY, OF NEW YORK, N. Y.

PERFORATING-MACHINE.

No. 893,420.  Specification of Letters Patent.  Patented July 14, 1908.

Application filed December 29, 1906. Serial No. 349,967.

*To all whom it may concern:*

Be it known that I, JOHN C. BARCLAY, a citizen of the United States, residing at New York, in the county of New York and State of New York, have invented certain new and useful Improvements in Perforating - Machines; and I do hereby declare the following to be a full, clear, and exact description of the same, such as will enable others skilled in the art to which it appertains to make and use the same.

My invention relates to improvements in perforating machines, and more particularly to machines of the class employed for perforating or otherwise marking paper strips or ribbons, such for example as those used in the Wheatstone automatic telegraph system and various other automatic and printing telegraph systems; my invention is not limited in its application to the perforating of telegraph strips and I may use it for any purpose for which marking or perforating machines or mechanism such as described are adapted.

The perforating machine herein illustrated and described is a key-board machine having character keys and levers arranged as in typewriting machines, and embodies improvements upon and modifications of the machines for the same purpose illustrated and described in my applications for Letters Patent Sr. No. 314,764, filed May 2nd, 1906, and Sr. No. 338,851, filed October 13, 1906.

The objects of my invention are to improve and simplify marking and perforating machines such as are employed in telegraph systems; to make such machines more rapid in action, to improve the "touch" and general working qualities of such machines, so that they may be operated without excessive labor on the part of the operator even at high speed; to improve and simplify the marking or punching mechanism, selecting mechanism, and paper feed mechanism, and other sub-mechanisms of machines of this class; to make the connection between the various key levers and the corresponding punching and spacing devices very direct; and generally to make the machine compact, relatively simple, relatively inexpensive to make, and comparatively noiseless in operation.

The machine illustrated in the accompanying drawings is adapted for perforating paper strips or ribbons for the Wheatstone and similar automatic telegraph systems. It may punch said strips according to any desired code, the selecting mechanism being arranged to cause the strip to be fed the proper distance, and to cause the proper arrangement of holes to be punched, for each particular character of the code selected. The mechanism of this machine comprises (a) punching mechanism; (b) paper feed mechanism; (c) a key-board comprising finger keys and selecting means operated thereby and controlling appropriate devices of the punching and paper feed mechanisms, whereby at each operation of a finger key, the proper combination is "set up" to punch this character in the strip, and by which space determining means are operated to regulate the feeding of the paper strip to correspond with the space occupied by each character so punched; (d) power mechanism, independent of but controlled by the keys, whereby the actual work of feeding the paper and of punching is performed by a motor, preferably a continuously running motor.

I will now proceed to describe my invention with reference to the accompanying drawings, in which one form of perforating machine embodying my invention is illustrated, and will then point out the novel features in claims.

In the said drawings: Figure 1 shows a top view of my said perforating machine, the box containing the paper reel being shown partly open; Fig. 2 shows a front elevation of the machine; Fig. 3 shows a detail side view of the key-board mechanism, the frame of the key-board, the selecting bars, and certain other parts being sectioned; Fig. 4 shows a top view of the right hand portion of the machine, the punching head and certain other parts being shown in section; Fig. 5 is a detail top view of a portion of the paper feeding device; Fig. 6 is a detail face view of a portion of the paper feeding device; Fig. 7 is a detail rear view of the paper feeding mechanism; Fig. 7ᵃ shows in detail parts of the stop adjusting mechanism; Fig. 8 shows a central vertical section through the punching mechanism on a plane parallel with the front of the machine; Fig. 9 shows a section through the punching and paper feed mechanism, the view being taken from the right of Fig. 1; Fig. 10 shows a detail top view of the gearing and clutches through which the punching and paper feed mechanisms are driven; Fig. 11 shows a front elevation of these parts; Fig. 12 shows a detail top view of the clutch through which the punching mechanism is driven; Fig. 13 is a detail elevation of the contact device for closing the circuit of the paper feed magnet; Figs. 14 and 15 are detail views of the friction drive of the paper feed mechanism; Fig. 14 being a face view of such mechanism with the perforated disk thereof removed, and Fig. 15 being a central vertical section of such mechanism; Fig. 16 is a detail view of a portion of a strip of paper as punched by the machine; Fig. 17 is a partial front view and partial vertical section of the punching head enlarged; said head being broken away progressively on a number of different planes to illustrate the construction of the parts; Fig. 18 is a top view of the lower and middle row punches assembled together, the upper row being removed and the punch head not being shown; Fig. 19 shows a transverse section across a few of the punches on the line $x$—$x$ of Fig. 18; Fig. 20 shows a similar section on line $y$—$y$ of Fig. 18; Fig. 21 shows a similar section on the line $z$—$z$ of Fig. 18; Fig. 22 shows a top view of the lower row punches assembled, the other punches being omitted; Fig. 23 shows diagrammatically the pivoted selecting bars arranged to raise and lower stop-adjusting pushers directly; Fig. 24 shows similarly the use of selecting wires for operating levers 103 of the stop adjusting mechanism shown in Fig. 7; Fig. 25 shows similarly the use of selecting wires for operating the carriers of the punch-actuating fingers direct; Fig. 26 shows similarly the use of tension wires instead of bars 8 for operating the pushers which raise the stop pins; Fig. 27 is a detail top view of the stop pin adjusting mechanism shown in Fig. 7; and Fig. 28 is a detail side view of a line indicator.

In said drawings, 1 designates generally a key-board, 2 designates generally a punching mechanism, 3 designates generally paper feed and spacing mechanism, 4 designates a driving motor, and 5 designates generally transmission mechanism. The key-board comprises finger keys 6 and corresponding key levers 7, each operating, through selecting devices hereinafter described, certain of two series of selecting bars, 8 and 9, located beneath the key-board. These bars, as shown particularly in Figs. 2, 7, 8 and 23, are mounted upon pivoted links 10 so as to move freely up and down while remaining horizontal at all times, and springs 11 counterbalance the weight of these bars and links and tend to hold the same upward. Each bar 8, when depressed by a key lever, effects the adjustment of a stop pin of the paper feed and spacing mechanisms, whereby the distance the paper strip is to be fed is regulated. For depressing the appropriate selecting bars of series 8 and 9, each key lever is provided with one or more lugs 12 (Figs. 3 and 8) located over the particular bars of series 9 which that lever is to operate, and is further provided with a similar lug 13 located over the particular bar of series 8 which that lever is to operate. Beneath the key levers and extending transversely across the key-board, is a universal bar 14 carried by arms 15 mounted upon a shaft 16, and this universal bar is normally held upward by springs 17 (Figs. 1 and 3). When any one of the finger keys is depressed and this universal bar is depressed, rotating shaft 16, means, hereinafter described, closes a clutch whereby motor 4 is caused to communicate motion to the punching mechanism. The finger keys have returning springs 18 (Fig. 3). The universal bar 14, when returned by its springs 17, causes an arm 19 (Fig. 13) mounted on shaft 16 to close contact between its contact spring 20 and an adjustable contact screw 21, thereby closing the circuit of the restoring magnet of the paper feed mechanism. The paper strip 22 passes around suitable guide rollers 23 and between tension rollers 24 and 25, through the punching mechanism 2, around the feed wheel of the paper feed mechanism 3, and thence through a paper guide 26 to the left hand side of the machine. The front of this guide being open (see Fig. 2) the punched strip passes in complete view of the operator who can thus read it at any time and so be advised of mistakes in punching.

*Punching mechanism.* (See particularly Figs. 1, 2, 4, 8, 9 and 17–22 inclusive.)—The punching mechanism comprises a plurality of punches arranged in three horizontal series, 27, 28 and 29, located one above another, and slidably mounted in a punch frame 30, in front of which is a die plate 31. The paper strip 22 passes through a slot between the front of frame 30 and said die plate. The middle row of punches, 28, punch in the paper strip, (see Fig. 16) a series of small holes designed to be engaged by the feed wheel of Wheatstone and similar automatic transmitters. These holes therefore form no part of the particular character punched, but are merely required for convenience in feeding the paper strip through the perforating machine and through said transmitter. It is preferable that said middle row of holes be punched at the time that the holes making up the character to be marked on said strip are punched, so as to insure exact correspondence between those holes which determine the characters, and the holes which determine the feeding of the paper strip. Hence, the employment of three series of punches in this machine. To actuate these punches, two series of fingers, 32 and 33, are provided; series 32 being arranged in front of series 33 and to be driven forward thereby. Each such finger 32 or 33, is mounted upon a separate bell crank 34, to which is connected a corresponding selecting bar of series 9. Springs 35 tend to hold bell cranks 34 up, in the position shown in Fig. 8.

Each finger 32 of the front series, has a head 36 adapted to actuate the opposite punch of the lower series 29, said head being above such punch, and therefore out of operative position with respect thereto, at all times, except when the corresponding bell crank 34 carrying that finger is depressed; depression of any of the bell cranks 34 which carry one of the front series of fingers 32, having the effect of moving that finger down so that its head 36 is opposite the corresponding punch of series 29. Each finger 33 of the rear series has, in like manner a head 37 adapted to actuate a corresponding punch of the upper series 27, but normally out of line with such punch, and adapted to be drawn into line therewith by depression of the corresponding bell crank 34; which bell crank will be depressed when the corresponding selecting bar of series 9 is actuated; and each of these rear fingers 33 is further provided with a second head 38 adapted to actuate that finger of series 32 which is directly in front. A universal bar 39 carried by pivoted arms 40 and normally held backward by a spring 41, returns both series of fingers. A driving arm 42 pivoted at 43 and actuated by a cam 44 on a shaft 45, drives forward all of said fingers each time said cam rotates; but although all of the fingers are thus driven forward, only those fingers actuate punches which have been depressed by their carriers and so brought into line with their respective punches. It will be seen, therefore, that by proper selection of selecting bars 9, any desired combination of upper and lower punches, or any punch or punches of either series, may be selected and operated.

The punches of series 29 are provided with lugs 46 (Figs. 18, 19 and 22) projecting up between the corresponding punches of series 28 and each engaging a lug 47 of the middle row punch immediately above it and also a corresponding lug 47 of the punch 28 next beyond. The punches of the upper series 27, each carry a lug 48 (Figs. 4, 8 and 9) engaging a lug 49 (Fig. 8) of the punches 28 beneath. The middle-row punches are arranged in pairs (with one additional punch to the right as viewed in Fig. 21) the left hand punch of each such pair (as viewed in Figs. 18 and 21) having a lug 49 secured to it, the right hand punch of such pair passing freely through a hole in such lug 49 but having itself a lug 50 which said lug 49 engages. The construction is such that when any punch 27 moves forward, its lug 48 engages the lug 49 of the pair of middle-row punches beneath, such lug 49 in turn engaging lug 50, and both of said middle-row punches being carried forward; and that when any punch 29 moves forward its lug 46, engaging the lug 47 of the punch 28 above and engaging also the lug 47 of the punch 28 next beyond, moves both forward. The punches are caused to operate in this manner, to correspond with the conditions of the telegraphic code according to which the holes are to be punched, space being required between the perforations.

To return the several punches, after the driver 42 and fingers 32 and 33 have been retracted, springs are provided. The several punches 28 of the middle row have each its individual return spring 51. For returning the upper row of punches 27, I provide a pivoted universal bar 52 (Fig. 8) engaging all of the lugs 48 of the upper-row punches, and having bell crank extensions 53 (Fig. 4) to which are connected springs 54. For returning the lower-row punches 29, I provide same with lugs 55, like lugs 48 but projecting downward, and engaging a universal bar 56 actuated by return springs 57.

Cam shaft 45 by which the driver 42 is operated, revolves intermittently, being driven from the motor 4 through a clutch 58 (Figs. 1, 9, 10 and 12). Said clutch comprises two jaw members, one, 59, driven by gear wheels 60 from the main driving shaft or armature shaft of the motor; the other jaw member, 61, being mounted to slide on shaft 45 and having a spring 62 tending to press it into engagement with member 59. A stop 63 (Figs. 10 and 11) pivoted at 64, normally engages a lug 65 carried by this clutch member 61 and holds it out of engagement with clutch member 59. But when universal bar 14 is depressed upon the depression of a finger key, and causes shaft 16 to rotate, an arm 66 (Fig. 1) mounted on said shaft, operating through link 67, moves downward a trip 68 (Fig. 11) mounted to move vertically as shown, thus freeing stop 63 from lug 65, and permitting clutch member 61 to be forced by spring 62 into engagement with clutch member 59, thereby causing shaft 45 to revolve. As trip 68 moves downward, a lug 69 engaging its cam surface 70, forces said trip to the left of Fig. 11 against the pressure of spring 71, so that said trip is caused to release the stop 62, which is at once pulled down by its spring 72 in position to engage lug 65 again upon the completion of one revolution of shaft 45. In the path of rotation of lug 65 is a spiral throw-out cam 73, which, near the conclusion of one revolution of lug 65, engages the same and forces it gradually away from clutch member 59, thus opening the clutch; and at the conclusion of one revolution lug 65 jumps from the end of cam 73 into engagement with stop 62 and is held thereby. The construction of the parts is such it will be seen, that for each depression of a finger key only one revolution of the cam shaft 44 can occur. Clutch member 61 is mounted to slide upon the shaft 45, but is not directly keyed thereto. Instead a disk 74 forming a backing for spring 62 is secured to shaft 45 and clutch member 58 has a projection 75

(Fig. 10) passing through a hole in disk 74 and engaging a notch 76 in a collar 77 on said shaft 45.

*Paper feed mechanism.*—Some of the characters of the telegraphic code such as that with which my perforator arranged as shown is particularly intended to be used, occupy more space than others. It is therefore desirable to cause the paper to be fed, not the maximum distance each time, but only the distance required for the particular character just punched. To this end I employ a second series of selecting bars, 8, and each finger key, when depressed, operates that selecting bar of series 8 which corresponds to the space on the paper strip occupied by the corresponding character. There may be as many of these selecting bars, each corresponding to a different length of feed of the paper strip, as desired. I have shown six such bars, which gives a sufficient number of different lengths of feed for the particular code which I prefer to employ. For other codes, as for example the ordinary Wheatstone code, I may provide more such bars and devices operated thereby.

The paper strip 22, after passing through the punching head 30, passes around a feed wheel 78 (Figs. 1, 4, 7, and 9) provided with teeth 79 adapted to enter the middle series of perforations in the paper strip 22, and so to insure uniform feeding of said paper strip by preventing slipping. This wheel carries a large number of stop pins 80, arranged in a circle near the periphery of the wheel, and adapted to slide vertically in said wheel. Each such pin is surrounded by a spiral spring 81, the only purpose of which is to act as a friction brake or drag thereon to hold said pin against gravity or vibration in any position in which the pin may be adjusted. Above wheel 78 is a plate 82 in which is a notch 83 (Figs. 4, 6 and 7) of a width corresponding to or greater than, the maximum length of feed required for any one character of the paper strip. In the very end of this notch there is a slot 84 extending through to the top of plate 82. Above plate 82 there is another plate 85 in which, and in the frame plate 86 above, there is another slot 87 registering with but wider than, notch 84. The feed drum of wheel 78 is arranged to be rotated intermittently by means to be described hereinafter; and prior to the beginning of such rotation, one of the stop pins 80 is moved upward by one of the six stop-setting arms 88 (Figs. 1, 4 and 7) operating through pivoted pushers as hereinafter described; each arm 88 corresponding to, and arranged to be operated by, a corresponding one of the series of selecting bars 8, as hereinafter described; that particular pin 80 being pushed up, which will permit the wheel 78 to rotate the proper distance by the time the upper end of such pin 80 engages the limiting shoulder 89 of slot 83. When the pin so raised encounters said shoulder 89 it comes to rest. To restore the pins 80 to first position I provide an arm 90 carried by a vertically slidable rod 91 (Fig. 7), but arranged also to rotate somewhat, and normally held to the left of Figs. 1 and 4, and right of Fig. 7, by a spring 92. The end of this arm 90 just clears shoulder 89, as shown in Fig. 5, but engages any pin 80 which has been elevated, such pin when brought to rest by shoulder 89, being half in engagement with said shoulder and half in engagement with arm 90.

I have previously explained that when any of the finger keys 6 is depressed the clutch 58 which drives the shaft 45 is closed and said shaft begins to rotate. Shaft 45 carries a cam 93 for pressing up sliding rod 91 against the tension of its spring 94; there being, above cam 93, a pivoted follower lever 95 arranged to be actuated by said cam and when so actuated to engage the lower end of rod 91 and lift same, as clearly appears from Fig. 7; and said rod, when so raised, is held in such elevated position by a detent 96 engaging a shoulder 97 on said rod; the detent being carried upon the armature lever 98 of a release magnet 99; there being a spring 100 tending to press lever 98 away from the magnet and so holding detent 96 underneath shoulder 97. The circuit of this magnet 99 is controlled by the contact device 20—21 of the key-board, previously mentioned. Such contact is, as previously stated, closed upon the release of any finger key which has been depressed; and when so closed the circuit of the magnet 99 is completed, and said magnet attracts its armature, moving the detent 96 from beneath the shoulder 97 and so permitting rod 91 to descend.

I have previously explained that when one of the stop pins 80 comes to rest against shoulder 89 it rests partly against said shoulder and partly against arm 90. The parts are shown in this position in Fig. 5. When, as previously explained, shaft 45 begins to rotate and rod 91 and arm 90 are raised by the action of cam 93, arm 90 rises above such stop pin 80 and is thrown back by spring 92 over the head of such pin 80. When magnet 99 is energized as above described, and releases rod 91, said rod is pressed downward by its spring 94, the arm 90 pressing down the stop pin 80 which has been raised, the wheel 78 then rotating until another pin 80, (raised, as hereinafter described, when the finger key which started shaft 45 in operation was depressed,) encounters arm 90 and shoulder 89 and comes to rest. The wheel 78 when thus rotated carries onward the paper strip 22.

As previously stated the distance through which the wheel 78 thus rotates is regulated by operating one or another of the arms 88 to raise one or another of the stop pins 8. One important feature of my invention resides in the means whereby these arms 88 are raised. I have found it quite important to raise these arms a constant distance always and also do the work of raising them by power, thus avoiding the doing of unnecessary work by the finger keys themselves. To this end I arrange arms 88 to slide longitudinally in a frame 102, into position to engage a power-driven reciprocating driver. Said arms 88 are so moved by rocker arms 103, each connected to and actuated by one of the selecting bars 8. 104 is the said driver, mounted to slide vertically, and provided with a spring 105 resting upon the follower lever 95 of cam 93 on shaft 45. When this follower lever is raised, therefore, driver 104 will be raised. Arms 88 are provided with notches 106 which prevent sliding member 104 from actuating any one of said arms unless that arm has been pushed forward by its rocker arm 103. If any one of said arms has been pressed outward by its rocker arm 103 when member 104 rises, such arm 88 will be raised.
In the particular construction shown, for convenience the arms 88 do not engage the stop pins 80 direct, but through one or another of a series of transversely-arranged pivoted pushers 101. Each such pusher has, over the particular arm 88 which is to operate it, a lug 101$^a$ (Fig. 7$^a$) deep enough to cause that arm 88 to operate said pusher, but not the others. The several lugs 101$^a$ are of progressively greater depth from the pivot outward, to compensate for increase of distance from the pivotal point. It will be seen that by this mechanism, the finger keys merely do the work of selecting the particular space-regulating or stop-setting arm 88 to be operated; and that the work of raising said arm, and with it the corresponding pusher 101, and the stop-pin 80 of wheel 78 directly above the end of said pusher, is performed by the power-driven mechanism actuated by cam 93 on shaft 45; also, that it is assured that each stop pin 80 will be raised the full distance necessary to insure arrest of the wheel 78 when such stop pin engages shoulder 89. I do not limit myself, however, to operating the rocker arms 103 by selecting bars 8; but instead may use other selecting devices adapted to be actuated by finger keys—for example, tension wires 8$^a$, as indicated in Fig. 24. In Fig. 26 I have shown spacing mechanism comprising pivoted levers 88$^a$, directly connected to and actuated by tension wires such as 8$^a$, and operating through pushers 101$^b$ to raise the stop pins 80, the pins being raised, therefore, by the direct action of the finger keys transmitted through the tension wires. This arrangement is covered in my application Sr. No. 338,851 before referred to. But since it has been found difficult, without making the tension wires unduly long, to cause all of the keys to raise the pins 80 sufficiently without some of the keys raising the pins 80 more than is necessary or desirable, I prefer to do the actual work of raising the stop pins by power-operated means, such as the slide 104, as shown in Fig. 24, as such power-operated means always raises the stop pins a sufficient distance and a practically uniform distance. It is still preferable to do the work of raising the pins 80 by power, even when the finger keys actuate the spacing mechanism through bars such as 8, instead of through tension wires; but since bars mounted as are bars 8 are depressed substantially the same distance by any key-lever of the keyboard, and in turn move levers connected to them substantially the same distance, no matter what key-lever may actuate them, I may employ mechanism in which the work of raising the stop pins 80 is performed directly by the action of the finger keys, transmitted through bars 8. Such a spacing mechanism is shown in Fig. 23, in which the bars 8 are shown connected to levers 88$^a$ actuating directly push-pins 101$^b$ located beneath the circle of the stop-pins 80.

Instead of operating the carriers 34 of the punch-actuating fingers 32 and 33 by means of selecting bars 9, I may use tension-wire selecting members 9$^a$ as shown particularly in Fig. 25.

Paper feed wheel 78 is rotated by a shaft 107 (Figs. 7 and 9) driven by gearing 108 and a shaft 109, the latter shaft driven from the motor 4 through a friction driving device 110 (Figs. 10, 11, 14 and 15) and a jaw clutch 111 (Figs. 9 and 10) like jaw clutch 58 of the punching-mechanism shaft 45, but controlled by a finger key 112, said clutch being normally closed. The friction driving device 110 comprises a gear wheel arranged to be driven from gearing 60, and having within it a chamber containing a spiral spring 113, one end of which is secured to the hub of a disk 114 carrying one of the jaw-members of clutch 111; the other end of said spring carrying a friction pad 115 bearing against the periphery of the gear 110. The construction is such that when gear wheel 110 revolves, the friction of its periphery against cushion 115 tends to drive disk 114 and so to drive shafts 109 and 107 through clutch 111; but if the feed wheel 78 be held against rotation, through engagement of one of its stop pins 80 with stop shoulder 89 (Fig. 5); then the wheel 110 will slip over pad 115, shafts 109 and 107 remaining stationary. As soon as the wheel 78 is released, however, the shafts 109 and 107 "pick up" instantly, and rotate said wheel. When one of the stop pins again arrests the rotation of the wheel 78, the wheel 110 at once slips over the cushion 115, permitting the shafts 109 and 107 to come to rest immediately without strain on the parts. The clutch 111 is provided to facilitate introduction of the paper strip into the paper feed mechanism. This clutch, when opened, permits the feed wheel 78 to be turned freely in either direction; a great convenience when introducing the paper. To prevent the spring 113 from unwinding when the clutch is opened, I provide the disk 114 with a row of perforations 116 in its periphery, and provide the key 112 with a pin 117 which will enter one of the perforations 116 and lock the disk 114 against backward rotation when said key is moved to open the clutch 111. A spring 118 engages the key 112 to prevent accidental movement thereof. To keep the paper strip 22 taut at all times while passing through the punching and paper feed mechanism, I employ the friction wheels 24 and 25, above mentioned. Wheel 25 is positively driven by a shaft 119, through a friction drive 120 (Fig. 4) but in a direction opposite that of travel of the paper strip past it. The other wheel, 24, is a spring-pressed idler.

*Operation.*—The operation of the machine is as follows: The paper strip 22 having been threaded past the guide rollers 23, between tension rollers 24 and 25, through the slot between the punch-frame 30 and die-plate 31, around the feed-wheel 78, and through the guide 26, when one of the finger keys 6 is depressed a corresponding combination of selecting bars 9 is actuated; the bell-cranks 34 connected to the bars 9 so operated, and the punch-actuating fingers 32, or 33, or both 32 and 33, carried thereby, being drawn down. At the same time, one of the selecting bars 8 is actuated, by the same finger key, and is caused to move its corresponding arm 88 (Fig. 7) into position to be engaged by sliding member 104. At the same time, clutch 58 is closed and shaft 45 begins to rotate, causing cam 93 to raise rod 91 carrying the stop-pin restoring-arm 90, and to raise slide 104, so carrying up the particular stop-pin setting-arm 88 and pivoted pusher 101 corresponding to the finger key which was depressed. The selected stop-pin 80 of wheel 78 is thereby raised into position to arrest the wheel 78 at the proper point. Cam 44 on shaft 45 being also revolved, driver 42 is pressed in, carrying with it the punch-actuating fingers 32 and 33; and those of said fingers which have been drawn down into operative position, as previously described, drive forward their corresponding punches 27 and 29; the proper center punches, 28, being carried forward with the upper and lower punches 27 and 29 actuated. All of these operations occur almost instantly upon the depression of the finger key 6. When said key is released, as it should be instantly, the circuit of release magnet 99 is completed by contact device 20—21, and the rod 91 (Fig. 7) is thereby released and is forced down by its spring 94, carrying with it the restoring arm 90 and depressing to normal position that stop pin 80 which has been holding the feed wheel 78 stationary. Said feed wheel then revolves until that stop pin 80 which was raised upon the depression of the key 6 just released, arrests the motion of the feed wheel. The feed wheel, in so rotating, carries the paper strip 22 forward a variable distance, depending upon the space required for the character just punched. At the conclusion of one revolution of shaft 45 the clutch 58 is opened automatically as previously described and the shaft comes to rest; the parts of the machine being then in readiness for the depression of the same or any other key of the keyboard and for the punching of the corresponding character on the strip 22 and the feeding of the strip forward the proper distance, all as just explained.

In a machine of this sort, designed to be operated at high speed and to be operated continuously for hours at a time, it is of the utmost importance that the "touch" and other qualities of the "action" of the machine which affect the rapidity of operation and the comfort of the operator, shall be the best possible. In particular, the touch must be light, the response to the depression of the keys must be instantaneous, and the punching must be performed with exceeding rapidity, so that no matter how fleeting the duration of the pressure on the finger key, the punching shall have been completed before the circuit of the release magnet 99 is closed. The mechanism illustrated and described herein fulfils these requirements. The touch, in particular, is very light, the selecting bars 8 and 9 being light and well balanced, and being exceedingly easy and quick in their movement, and the only work done by these bars, in the preferred embodiment of my invention, being the selecting of the punch-operating fingers and space-determining fingers to be operated.

I commonly provide, in connection with the punching mechanism, a chute 121 to carry off the punchings or chips. And I also commonly provide in connection with the paper guide 26, a simple form of cutting knife 122 for cutting the strip at the conclusion of a message.

I intend the term "punches" as used in the following claims, to be generic to any device adapted to be actuated in the manner described for marking a paper strip or the like.

When my perforator is used in connection with a printing telegraph system the receiving printers of which are of the page-printing type, I may employ in connection with the perforator a line indicator, to show the operator when a line has been filled. One form of line indicator I show in Figs. 1 and 28, the same comprising a rotary wheel 123 having on its periphery a series of numbers indicating letter-spaces in the line printed by the receiving printer; a ratchet wheel 124 connected to said wheel 123; a pawl 125 carried by an arm 126 on the universal shaft 16 and arranged to advance said ratchet wheel 124 and number wheel 123 step by step as the finger keys 6 are depressed; a pin 128 arranged to engage a cam surface 127 to throw said pawl out of engagement with the ratchet wheel at the conclusion of a step and to keep it out of such engagement until arm 126 begins to descend again; a spiral spring 129 tending to return wheels 123 and 124 to starting point; a detent pawl 130 normally preventing return of said wheels; and a bar 131 arranged to be rocked by one of the key levers when depressed (in practice, the key lever which causes the punching on the paper strip of the carriage-return character) and arranged when so rocked to release the pawl 130 from wheel 124. The operation of this device will be obvious.

What I claim is:—

1. A machine of the class described comprising in combination feed mechanism comprising a movable carrier, provided with stops, a plurality of character members, and means operated thereby for setting selected stops of said carrier, comprising a reciprocating driver, and a plurality of stop-setting members movable therewith and also movable into and out of engagement therewith, and selecting means operated by said character members for moving selected stop-setting members into engagement with said driver.

2. A machine of the class described comprising in combination feed mechanism comprising a movable carrier, provided with stops, a plurality of character members, and means operated thereby for setting selected stops of said carrier, comprising a driver, means for transmitting power thereto controlled by said character members, a plurality of stop-setting members movable with said driver and also movable into and out of engagement therewith, and selecting means operated by said character members for moving selected stop-setting members into engagement with said driver.

3. A machine of the class described comprising in combination feed mechanism comprising a movable carrier, provided with stops, a plurality of character members, and means operated thereby for setting selected stops of said carrier, comprising a driver, a plurality of stop-setting members movable with said driver and also movable into and out of engagement therewith, corresponding stop-pushers, one for each such stop-setting member, located between same and said stops, and selecting means operated by said character members for moving selected stop-setting members into engagement with said driver.

4. A machine of the class described comprising in combination feed mechanism comprising a movable carrier, provided with stops, a plurality of character members, and means operated thereby for setting selected stops of said carrier, comprising a driver, a plurality of arms movable with said driver and also movable into and out of engagement therewith, stop-pusher arms arranged transversely across said first arms, each such first arm arranged, when operated by said driver, to operate a corresponding pusher-arm, and means operated by said character members for moving the arms so engaged by the driver into and out of engagement therewith.

5. A machine of the class described comprising in combination a movable carrier provided with stops, a driver, two series of arms arranged transversely with respect to each other, the arms of one series adapted to be moved into and out of engagement with said driver and to move therewith, the arms of the other series arranged to operate said stops, each arm of the first series arranged to operate a particular arm of the other series, and means for so moving the arms of said first series.

6. A machine of the class described comprising in combination a movable carrier provided with stops, a driver, a series of arms arranged to slide into position for engagement by said driver and to move with said driver, a series of pivoted arms arranged transversely with respect to the first arms and each arranged to be engaged and lifted by a corresponding one of said first series, and means for so moving the arms of said first series, the arms of said second series arranged to actuate said stops.

7. A machine of the class described comprising in combination a movable carrier provided with stops, a plurality of character keys, selecting mechanism operated thereby comprising a plurality of selector bars, and means for setting said stops comprising stop-setting arms, a reciprocating driver, and means operated by said selector bars for moving a selected stop-setting arm into position for engagement by said driver.

8. A machine of the class described comprising in combination a movable carrier provided with stops, a plurality of character keys, selecting mechanism operated thereby comprising a plurality of selector bars, means for setting said stops comprising stop-setting arms, a reciprocating driver, and means operated by said selector bars for moving a selected stop-setting arm into position for engagement by said driver, a stop-restoring arm, and means for operating same comprising a cam and a follower, said follower likewise arranged to operate said driver.

9. A machine of the class described, comprising in combination a plurality of character keys, selecting mechanism operated thereby comprising a plurality of selector bars mounted upon swinging arms and having substantially a parallel movement, and punching mechanism comprising a plurality of punches, punch-actuating fingers, and pivoted carriers connected to and selectively actuated by said selector bars and mounted to move in planes substantially parallel to the planes in which their respective selector bars move.

10. A machine of the class described, comprising in combination a plurality of character keys, selecting mechanism operated thereby comprising a plurality of selector bars mounted upon swinging arms and having substantially a parallel movement, and punching mechanism comprising a plurality of punches, upright actuating fingers, and bell crank carriers connected to and selectively actuated by said selector bars and mounted to move in planes substantially parallel to the planes in which their respective selector bars move.

11. A machine of the class described, comprising in combination a plurality of character keys, selecting mechanism operated thereby comprising a plurality of selector bars mounted upon swinging arms and arranged beneath said character keys and having substantially a parallel movement, and punching mechanism comprising a plurality of punches, punch-actuating fingers, and pivoted carriers connected to and selectively actuated by said selector bars and mounted to move in planes substantially parallel to the planes in which their respective selector bars move.

12. A perforating machine comprising in combination a punch head, punches therein, a series of carriers movable in a direction transverse to the direction of motion of said punches, punch-actuating fingers mounted on said carriers, a driver for said fingers, a cam therefor, driving means for said cam, a plurality of finger keys and selector bars selectively actuated thereby and mechanically connected to said carriers and arranged to actuate same selectively, said selector bars mounted to move in planes substantially parallel to the planes in which move the carriers to which they are respectively connected.

13. A perforating machine comprising in combination punching and paper feed mechanism, character members and means operated thereby controlling said mechanisms, a power member and means operated thereby for transmitting motion to mechanism of said machine comprising an automatically closing clutch, a detent normally holding said clutch open, a sliding trip movable in the direction of motion of said detent and normally engaging said detent and provided with a cam surface for throwing said trip out of engagement with said detent, means for engaging such cam surface for such purpose, and a bar pivoted to said trip and arranged to actuate same to release the detent, and means for actuating said bar upon the actuation of any of said character members.

In testimony whereof I affix my signature, in the presence of two witnesses.

JOHN C. BARCLAY.

Witnesses:
  B. STEIN,
  C. A. VAN BRUNT.